United States Patent [19]

Nemoto et al.

[11] Patent Number: 5,546,149
[45] Date of Patent: Aug. 13, 1996

[54] FOCAL PLANE SHUTTER

[75] Inventors: Ichiro Nemoto; Hiroyuki Izumi; Nobuyuki Fukui; Kunioki Takahashi, all of Yotsukaido, Japan

[73] Assignee: Seiko Precision Inc., Japan

[21] Appl. No.: 250,477

[22] Filed: May 27, 1994

[30] Foreign Application Priority Data

May 28, 1993 [JP] Japan .................................. 5-028261

[51] Int. Cl.⁶ ................................................ G03B 9/20
[52] U.S. Cl. ............................................ 354/265; 354/261
[58] Field of Search .................................. 354/253, 261, 354/262, 263, 264, 265

[56] References Cited

U.S. PATENT DOCUMENTS 3,580,156  5/1971  Loseries .
4,728,975  3/1988  Ohara et al. ....................... 354/173.1
4,994,834  2/1991  Watabe et al. .

FOREIGN PATENT DOCUMENTS 2324541  11/1973  Germany .
934823  2/1985  U.S.S.R. .
1381465  12/1975  United Kingdom .

*Primary Examiner*—Michael L. Gellner
*Assistant Examiner*—Daniel Chapik
*Attorney, Agent, or Firm*—Adams & Wilks

[57] ABSTRACT

A focal plane shutter for a camera comprises opening and closing blade units operable to open and close a shutter opening of the camera. Each blade unit has a leading blade and trailing blades in superposed relation to the leading blade. The leading blade and the trailing blades are supported by arm members through hollow pivot pins. The hollow pivot pins supporting the leading blade of each blade unit are covered by the trailing blades. Due to the use of hollow pivot pins, the overall weight and driving force of the blade units are effectively reduced to thereby make the shutter free of operational impact without light leakage.

10 Claims, 2 Drawing Sheets

FOCAL PLANE SHUTTER

BACKGROUND OF THE INVENTION

The present invention relates generally to a focal plane shutter for a camera, and more particularly to a focal plane shutter comprising a group of blades divided into a plurality of blade units operable to open and close a shutter opening.

The blade mechanism of a conventional focal plane shutter for cameras comprises a group of blades divided into a plurality of blade units. Each blade unit comprises a leading blade and a plurality of trailing blades in superposed relation to the leading blade. The blades of each blade unit are pivotally connected to one end of arm members by a first set of pivot pins, and the arm members are supported at the other end to one side of a shutter base plate by a second set of pivot pins at positions from top ends to intermediate portions of the arm members (see Japanese Patent Publication No. S54-191753). This type of conventional focal plane shutter operates efficiently and is suitable for fast operation since all of the blades are directly or indirectly supported by the arm members.

In order to meet the demand for a faster exposure time following the improvement of film sensitivity, it has been proposed to reduce the overall weight of the blade unit by reducing the size of the pivot pins. However, when the size of the pivot pins is reduced for the purpose of reducing the overall weight of the blade unit, the durability of the blade unit is compromised due to the extreme pressure applied on each of the pivot pins during an exposure operation.

The pivot pins connecting the trailing blades to the arm members have been formed with a through-hole along the axis thereof so as to have a hollow configuration, thereby minimizing the weight of the overall blade unit. This has been made possible since the pivot pins supporting each of the trailing blades are either covered by a superposed trailing blade or not located at the shutter opening. Thus, such pivot pins do not give rise to leakage of light and can thereby be made hollow to reduce the weight of the blade unit.

However, the pivot pins connecting the leading blade to the arm members have the largest inertia mass and are located in the shutter opening when the shutter opening is covered. Thus if the pivot pins connecting the leading blade to the arm members are provided with a through-hole to reduce the overall weight of the blade unit, leakage of light results causing the film to be exposed. Accordingly, it has been difficult to reduce the overall weight of the blade units of conventional focal plane shutters.

SUMMARY OF THE INVENTION

An object of the present invention is to provide a focal plane shutter comprised of a group of blades divided into an opening and closing blade unit .each having a leading blade and a plurality of trailing blades in superposed relation to the leading blade, and a plurality of arm members for pivotally supporting the blades by means of pivot pins.

According to the present invention, the trailing blades in superposed relation to the leading blade are arranged so as to be disposed over or cover a portion of the leading blade where it is supported to the arm members by one of the pivot pins. Accordingly, all of the pivot pins can be made hollow without leakage of light, thereby allowing the overall weight of the blade units to be minimized.

DETAILED DESCRIPTION OF PREFERRED EMBODIMENT

A preferred embodiment of the present invention will now be described in detail with reference to the accompanying drawings.

Figure 1:
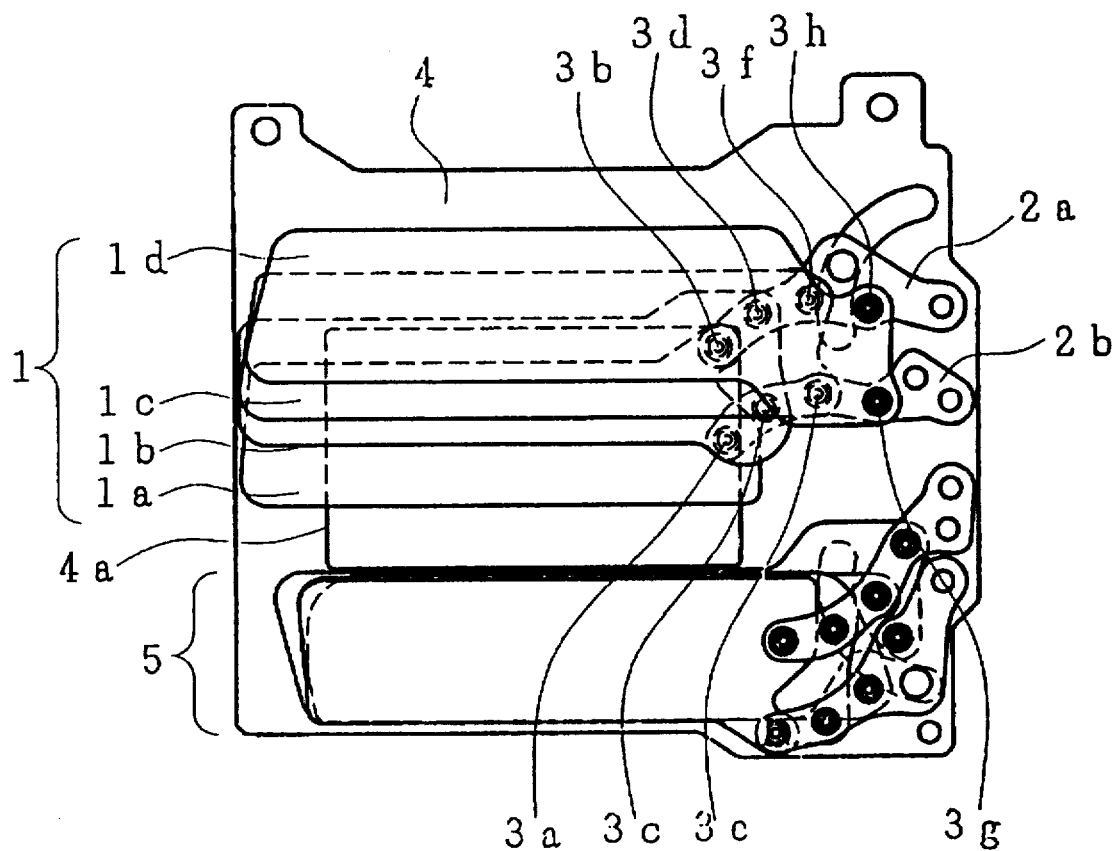
FIG. 1 is a plan view of a focal plane shutter according to one embodiment of the present invention.

FIG. 1 is a plan view of a focal plane shutter according to the present invention shown in a state in which the shutter is in the course of exposure. The shutter comprises a group of blades divided into an opening blade unit 1 and a closing blade unit 5. The opening blade unit 1 and the closing blade unit 5 are supported by a base plate 4 having a shutter opening 4a.

The opening blade unit 1 is comprised of a leading or slit-forming blade 1a and trailing blades 1b, 1c and 1d in superposed relation to the leading blade. The leading blade 1a is connected through pivotal pins 3a and 3b to one end of each of two arm members 2a and 2b. The other end of each of the arm members 2a and 2b is pivotally connected to the base plate 4. The trailing blades 1b, 1c and 1d are connected through pivot pins 3c, 3d, 3e, 3f, 3g and 3h to the arm members 2a and 2b. The pivot pins 3a through 3h are hollow to reduce their weight and are preferably formed with a central through-hole 6 (FIG. 2) defining hollow pivot pins. The closed blade unit 5 is arranged and mounted on the base plate 4 in the same manner as the open blade unit 1 and is operated in an identical manner.

Figure 2:
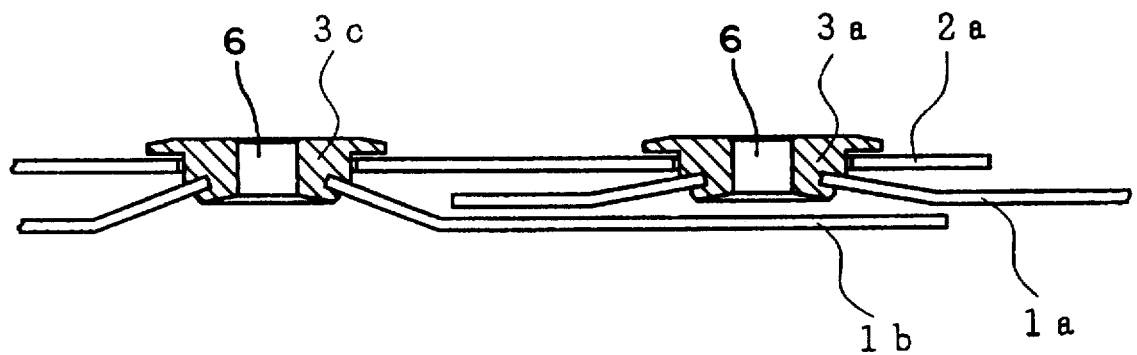
FIG. 2 is a sectional view of the pivot pins of a blade unit of the focal plane shutter of FIG. 1.

FIG. 2 shows a sectional view of the hollow pivot pin 3a of the leading blade 1a and the hollow pivot pin 3c of the trailing blade 1b shown in FIG. 1. According to the present invention, the trailing blade 1b which overlaps the leading blade 1a always covers the hollow pivot pin 3a connecting the leading blade 1b to the arm member 2b. The overlapping trailing blades 1b, 1c and 1d always cover the hollow pivot pin 3b connecting the leading blade 1a to the arm member 2a.

Next, the operation of the focal plane shutter according to the present embodiment will be described. When a shutter release operation is effected, the blades 1a, 1b, 1c, 1d and 1e of the opening blade unit 1 are displaced upwardly to uncover or open the shutter opening 4a while the blades of the closing blade unit 5 remain in a retracted position beneath the shutter opening 4a. This condition is shown in FIG. 1. At this time, since the pivot pins 3a and 3b of the leading blade 1a are covered by the trailing blades 1b, 1c and 1d, there is no danger of leakage of light as a result of the pivot pins 3a and 3b having the through-holes 6.

When a predetermined time has elapsed, the blades of closing blade unit 5 are displaced upwardly to cover or close the shutter opening 4a, thereby terminating the shutter exposure operation. In this case, in order to prevent the trailing blades 1b, 1c and 1d from projecting forwardly of the edge of the leading blade 1a during the time when the edge of the leading blade 1a travels within the shutter opening 4a, it is necessary to predetermine the positions of the pivot pins 3a and 3b connecting the leading blade 1a to the arm members 2a and 2b.

According to the structure of the focal plane shutter of the present invention, since all of the pivot pins can have a hollow configuration, including the pivot pins 3a and 3b of the leading blade 1a, the overall weight of the shutter is effectively reduced. That is, the inertia mass of the leading blade 1a can be effectively reduced by providing each of the pivot pins with a through-hole while ensuring that leakage of light does not occur. Thus, the drive force or inertial load of the leading blade 1a is effectively reduced, as well as reducing operational noise and shock of the blade unit. This results in an increase in the durability of the shutter.

Moreover, since all of the pivot pins can be made of hollow construction, it is not necessary to provide pivot pins having both hollow and solid construction as it has been heretofore necessary in the prior art. Thus the present invention provides a focal plane shutter which is both economical and easy to fabricate.

What is claimed is:

1. A focal plane shutter for a camera, comprising:

at least one blade unit displaceable to cover and uncover a shutter opening, the blade unit having a leading blade and a plurality of trailing blades arranged in superposed relation to the leading blade; a plurality of arm members connected to the leading blade and the trailing blades to effect displacement of the leading blade and the trailing blades relative to the shutter opening; and a plurality of first pins pivotally connecting the arm members to the leading blade and the trailing blades, each of the trailing blades being disposed over and covering the first pins which connect the arm members to the leading blade.

2. A focal plane shutter according to claim 1; wherein the first pins have a hollow construction.

3. A focal plane shutter according to claim 1; including another blade unit displaceable to cover and uncover the shutter opening.

4. A focal plane shutter according to claim 1; including a base plate having the shutter opening extending therethrough, and a plurality of second pins pivotally mounting the arm members to the base plate.

5. A focal plane shutter according to claim 4; wherein the second pins have a hollow construction.

6. A focal plane shutter for a camera, comprising:

first and second blade units displaceable to cover and uncover a shutter opening, each of the first and second blade units having a leading blade and a plurality of trailing blades arranged in superposed relation to the leading blade; a plurality of arm members connected to the leading blades and the trailing blades to effect displacement of the leading blades and the trailing blades relative to the shutter opening; and a plurality of first pins pivotally connecting the arm members to the leading blades and the trailing blades, each of the trailing blades being disposed over and covering the first pins which connect the arm members to the leading blades.

7. A focal plane shutter according to claim 6; wherein the first pins have a hollow construction.

8. A focal plane shutter according to claim 6; including a base plate having the shutter opening extending therethrough, and a plurality of second pins pivotally mounting the arm members to the base plate.

9. A focal plane shutter according to claim 8; wherein the second pins have a hollow construction.

10. A focal plane shutter according to claim 9; wherein the first pins have a hollow construction.

* * * * *